United States Patent [19]

Leavitt

[11] Patent Number: 5,451,383
[45] Date of Patent: Sep. 19, 1995

[54] LITHIUM RECOVERY

[75] Inventor: Frederick W. Leavitt, Amherst, N.Y.

[73] Assignee: Praxair Technology, Inc., Danbury, Conn.

[21] Appl. No.: 172,297

[22] Filed: Dec. 23, 1993

[51] Int. Cl.[6] .............................................. B01D 15/04
[52] U.S. Cl. .................................. 423/179.5; 210/677; 210/681; 423/181
[58] Field of Search ............... 210/670, 672, 677, 678, 210/681, 663, 664, 665; 423/179.5, 181

[56] References Cited

U.S. PATENT DOCUMENTS

| | | | |
|---|---|---|---|
| 2,980,498 | 4/1961 | Wheaton et al. | 423/181 |
| 2,980,499 | 4/1961 | Goodenough et al. | 423/181 |
| 3,033,641 | 5/1962 | Thomas | 210/681 |
| 4,243,641 | 1/1981 | Ishimori et al. | 423/179.5 |
| 4,723,962 | 2/1988 | Mehta | 423/179.5 |
| 4,859,217 | 8/1989 | Chao | 55/68 |
| 5,152,813 | 10/1992 | Coe et al. | 55/26 |
| 5,174,979 | 12/1992 | Chao et al. | 423/715 |

Primary Examiner—Ivars Cintins
Attorney, Agent, or Firm—Alvin H. Fritschler

[57] ABSTRACT

In the production of lithium-exchange adsorbents, lithium recovery from spent ion-exchange solutions is achieved with advantageous secondary recovery of lithium from zeolite wash liquor and precipitate salts by ion-exchange means.

9 Claims, 3 Drawing Sheets and concentrates lithium chloride so that it can be readily introduced into a plant for further purification by evaporative concentration and fractional crystallization. The recovered lithium is used in the ion-exchange process employed in the production of lithium-exchanged zeolite.

LITHIUM RECOVERY

BACKGROUND OF THE INVENTION

1. Field of the Invention

The invention relates to advanced adsorbents useful in pressure swing adsorption processes. More particularly, it relates to the recovery of lithium used for the production of the lithium exchanged forms of such advanced adsorbents.

2. Description of the Prior Art

In chemical processing, refinery, metal production and other industrial applications, purified gas streams are employed for a variety of processing purposes. For example, high purity oxygen is used in chemical processing, steel mills, paper mills, and in lead and gas production operations. Oxygen and nitrogen are produced from air, typically by cryogenic distillation. While such cryogenic processing can be very efficient, particularly when conducted in large size plants, it nevertheless requires complex and costly equipment.

Pressure swing adsorption (PSA) processes have also been used to separate and purify gases, as for the production of oxygen generally in relatively smaller-sized operations where the use of cryogenic air separation may not be economically feasible. Many commonly available adsorbents, particularly the class of materials known as molecular sieves, selectively adsorb nitrogen more strongly then oxygen, and this preferential adsorption is the basis of a variety of PSA processes that have been developed for the separation of air to produce oxygen and nitrogen product gas.

The Chao U.S. Pat. No. 4,859,217, discloses the lithium cation forms of zeolite X, particularly the forms in which the framework Si/Al molar ratio is from about 2.0 to about 3.0, preferably from 2.0 to 2.5, wherein at least about 88%, preferably at least 90%, and more preferably at least 95%, of the $AlO_2{}^-$ tetrahedral units are associated with lithium cations. In the Chao et al. patent, U.S. Pat. No. 5,174,979, lithium/alkaline earth metal zeolites of the X and A type are disclosed, with lithium to earth metal ratios of 95:5 to 50:50, and 10:90 to 70:30, respectively.

Such mixed cation materials are also well suited to PSA-air separation operations and have high thermal stability characteristics.

Li+ zeolites are commonly prepared from the corresponding Na+ zeolites by ion exchange. A concentrated aqueous solution of Li+Cl− is passed through a column containing the Na+ zeolite. The Na+ ions are displaced by the Li+ ions to produce the desired Li+ zeolite. Since zeolites generally have a greater affinity for the Na+ ion than for the Li+ ion, a considerable quantity of strong Li+Cl− solution is required, and the spent liquor from such ion-exchange operations contains a high concentration of both Na+ and Li+ ions. The contained lithium is too valuable simply to waste, and a process of evaporative concentration and fractional crystallization can be employed to remove by precipitation most of the NaCl, leaving a concentrated Li+Cl− solution that can be reused in the ion-exchange process. Thus, the bulk of the lithium is retained in the ion-exchange system.

After conversion, the lithium-exchanged adsorbent must be washed and dried prior to use in PSA operations. The spent wash water contains Li+ ions, which are lost in the discharged waste water. In addition, other Li+ is lost in off-specification exchanged zeolite. This Li+ can be released into solution by displacement with Na+. Still more Li+ is lost in the Li+-rich solution that adheres to the precipitated NaCl crystals. This latter lithium could be recovered in solution by washing the crystals in soft water.

The concentrated Li+ solutions resulting from desired ion-exchange operations for the production of lithium exchanged zeolites can be economically treated for the recovery of lithium in said recrystallization plant. However, dilute Li+-containing solutions would require too much energy consumption in order to be treated in this manner. As a result, such dilute Li+-containing solutions are often discharged as waste. Unlike NaCl, which is abundant and cheap, LiCl is a rare and costly commodity. Thus, the Li+ lost to waste adds appreciably to the overall cost of producing lithium exchanged zeolite. There is a strong desire and economic need in the art to recover such Li otherwise lost to waste so as to reduce the overall processing cost of producing lithium exchanged zeolite.

It is an object of the invention to provide a process for the recovery of lithium from the dilute Li+-containing solutions obtained in the production of lithium exchanged adsorbents.

With these and other objects in mind, the invention is hereinafter described in detail, the novel features thereof being particularly pointed out in the appended claims.

SUMMARY OF THE INVENTION

The Li+ from dilute solutions is captured and concentrated to produce a concentrated Li+ solution that can be used in the zeolite ion-exchange process or can be further purified and concentrated in a fractional crystallization plant by evaporative concentration and fractional crystallization to provide a concentrated LiCl solution that can be reused in the ion exchange process for producing lithium exchanged zeolites.

BRIEF DESCRIPTION OF THE DRAWINGS

The invention is hereinafter described in detail with reference to the accompanying drawings in which.

DETAILED DESCRIPTION OF THE INVENTION

Figure 1:
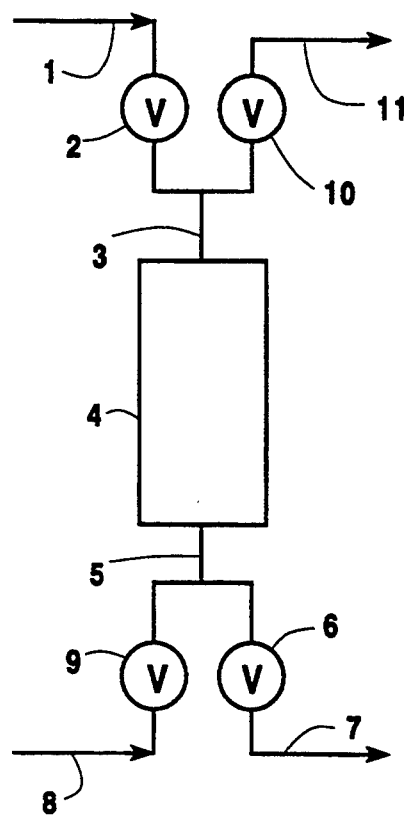
FIG. 1 is a schematic flow diagram of a single bed embodiment of the process for the concentration of Li+ ions from dilute solutions thereof.

The objects of the invention are accomplished by a lithium recovery process in which a lithium concentration process is used to facilitate recovery of some of the lithium otherwise lost during the production of lithium-exchange adsorbents. The process concentrates lithium chloride from spent wash water or other dilute solutions in one or more fixed-bed ion exchanges. The concentrating process is driven by strong solutions rich in sodium chloride. The practice of the invention enables a significant reduction in the Li+ lost in the overall production of advanced adsorbents, thereby lowering the overall cost of such desirable production operations.

The Li+ recovery process of the invention uses readily available materials and reagents, and adds little to process cost and complexity. In the treatment of dilute solutions, the energy expended in the subject Li+ recovery process is less than the energy that would otherwise be required to treat dilute solutions by means of the recrystallization techniques used for more concentrated solutions.

In the overall process of the invention, evaporative concentration and fractional crystallization are used to remove, by precipitation, most of the NaCl leaving a concentrated LiCl solution, which can be reused in the ion exchange process for the production of advanced lithium-exchanged adsorbents.

Further, the invention comprises a separate, secondary ion-exchange process that captures and concentrates Li+ from dilute solutions to produce a solution that can be reused on the zeolite conversion process for the production of advanced adsorbents or can be further purified and concentrated in a recrystallization plant. The ion-exchange process of the invention can capture and concentrate valuable ions, such as Li+, from a dilute solution thereof. Upon regeneration with a concentrated solution of Na+, which is cheap, the valuable Li+ can be recovered as a concentrated solution.

The Li+ is recovered in a separate ion-exchange process, which is conducted in one or more columns or beds packed with zeolite, or with a strong acid cation-exchange resin. The zeolite or resin is in either the Li+ or Na+ form. When an aqueous ionic solution is passed through such a bed, two waves or fronts are generated. First, there is a concentration front that progresses relatively rapidly through the bed. The delay in the emergence of this wave from the bed is due to the ion storage in the mobile solution phase within the bed. Due to the exchange process with the zeolite, or resin, there is an additional storage for the ions that form the counter-ions on the solid ion-exchange material. Thus, a second front is formed that corresponds to the exchange gradient between Li+ and Na+ ions. This front travels in the bed more slowly than the concentration front. In the practice of the invention, the concentration fronts are swept out of each bed, but the exchange fronts are partially retained within the bed or beds.

For the exchange purposes hereof, a dilute Li+ solution is flown downward into a bed loaded largely with Na+ ions, in equilibrium with a concentrated solution of Na+Cl−. The Li+ displaces some of the Na+, in spite of the fact that the zeolite or resin usually favors Na+ in the immobile phase. The bed thus discharges a concentrated Na+ rich solution, which may be sent to the bottom of another bed or may be discharged to waste. After the concentration wave has passed through the bed, the dilute Li+ solution is continued to be introduced to the top of the first bed, while dilute Na+ solution continues to emerge from the bottom and is discharged as waste. When excessive quantities of Li+ build up in this discharge stream, due to the leading edge of the exchange front approaching or reaching the bottom end of the bed, the charge step is terminated. Regeneration is effected by flowing concentrated Na+Cl− upward in the bed, much of which is now in equilibrium with dilute Li+Cl−. This dilute solution thereby emerges from the top of the first bed and may be passed for introduction to the top or inlet of another bed. After the concentration wave emerges, concentrated Na+Cl− continues to flow upward in the first bed, while concentrated Li+Cl− is discharged as the recovery product. When the exchange wave emerges, this stream becomes Li+ poor and Na+ rich. The regeneration step is then terminated, and the cycle is repeated. The process is conveniently conducted in a single bed or in multiple beds. In the latter case, the other beds undergo the same sequence of steps, but in a different phase.

The one or more columnar beds used in the practice of the invention are packed with an ion-exchanging zeolite or with a strong cation ion-exchange resin. The zeolite material can conveniently be obtained from off-specification zeolite from the zeolite conversion plant. With a single bed embodiment of the invention, the process steps are carried out sequentially and intermittently. Storage tanks would be required if continuous stream flows are required. With two or more beds, the process streams can be employed in steady state operation, or nearly so. An additional advantage of using multiple beds is that streams can be transferred from one bed to another, when the beds are shifted between the charge and regeneration portions of the process, improving the efficiency of the separation process.

The process will be understood to comprise two basic steps: (1) Charge and (2) Regeneration, both of which can be advantageously subdivided into two parts, (a) and (b), when more than one bed is employed. With reference to the single bed embodiment of FIG. 1 of the drawings, during the Charge step 1, a dilute aqueous Li+Cl− solution is admitted through line 1, containing valve 2, and line 3 to bed 4, containing the ion-exchange zeolite or resin. This material is initially in near equilibrium with concentrated Na+Cl− solution. The discharge from bed 4 flows through line 5, valve 6 and discharge line 7. At the beginning of the Charge step, a concentration gradient is established and proceeds through bed 4. Before this wave emerges, the discharge stream is a concentrated Na+ solution. The concentration of the discharge stream then drops, and the discharge becomes dilute Na+ solution. This condition persists through most of the step, while Li+ ions displace Na+ ions from the bed. It should be noted that this exchange occurs even when Na+ is the more strongly held ion on the zeolite or resin, as is generally the case. The displacement still occurs, but the ion-exchange wave is more diffuse when a more weakly held ion displaces a more strongly held ion. Eventually, the Li+ concentration rises in the discharge stream and, when the concentration becomes too high, Charge step (1) is terminated. Valves 2 and 6 are then closed, and valves 9 and 10, in purge line 8 to said line 5 and in product recovery line 11, respectively, are opened for the amendment of Regeneration step (2).

In said step (2), a concentrated solution of Na+Cl− is admitted through line 8, valve 9 and line 5 to the bottom of bed 4. A concentration gradient is again established in said bed 4 and moves quickly upward therein. Early in step (2), a dilute Li+ solution emerges through line 3, valve 10 and recovery line 11. When the concentration wave reaches the end of the bed, the concentration of Li+ rises appreciably, and the effluent from recovery line 11 constituting a concentrated Li+ solution is the desired Li+ recovery product. This concentrated solution can be returned to the primary ion-exchange plant for the production of lithium-exchanged advanced adsorbent, or is passed to the recrystallization plant for further purification.

It should be noted that, during the early part of each step before the concentration wave emerges, the effluent is not the desired product or waste composition. The effluent stream during these portions of the process can be diverted or stored, or the consequent dilution of the product stream and loss of the NaCl in the waste stream can be tolerated. A more desirable approach is to use a multiple bed system, such as the two-bed system shown in FIG. 2 of the drawings. The process Charge and Regeneration steps are subdivided in this approach. If bed 4A is at the start of the Charge step (1) and bed 4B is at the start of Regeneration step (2), during Charge step 1a, before the concentration wave emerges from bed 4A through line 5A and valve 6A, valve 12A is opened to permit the effluent from bed 4A to be passed therethrough to enter the bottom of bed 4B. The concentrated Na+ solution in the bed 4A effluent is thus recycled to bed 4B rather than being discharged to waste through line 7B. At the start of Regeneration step (2) for bed 4A, valve 13a is opened so that dilute Li+ solution is sent to the top of bed 4B rather than blending with the concentrated Li+Cl− product withdrawn from the system through valve 10A and recovery line 11A. Bed 4B then undergoes the same steps as in bed 4A, but 180° out of phase assuming that the Charge and Regeneration steps are of equal duration. In some instances, it may be preferable to have unequal times for the Charge and Regeneration steps, in which case additional beds could be employed or external storage tanks could be used. In other respects, the FIG. 2 embodiment functions in the manner described for a single bed embodiment of FIG. 1.

The process of the invention can be viewed as a "concentration swing" process because it employs a concentrated solution of NaCl to increase the concentration of a dilute solution of LiCl. It should be noted that there is no predominant dependence on pressure in the ion exchange process, and the number density of "counter ions" in the zeolite or resin is effectively constant.

Figure 2:
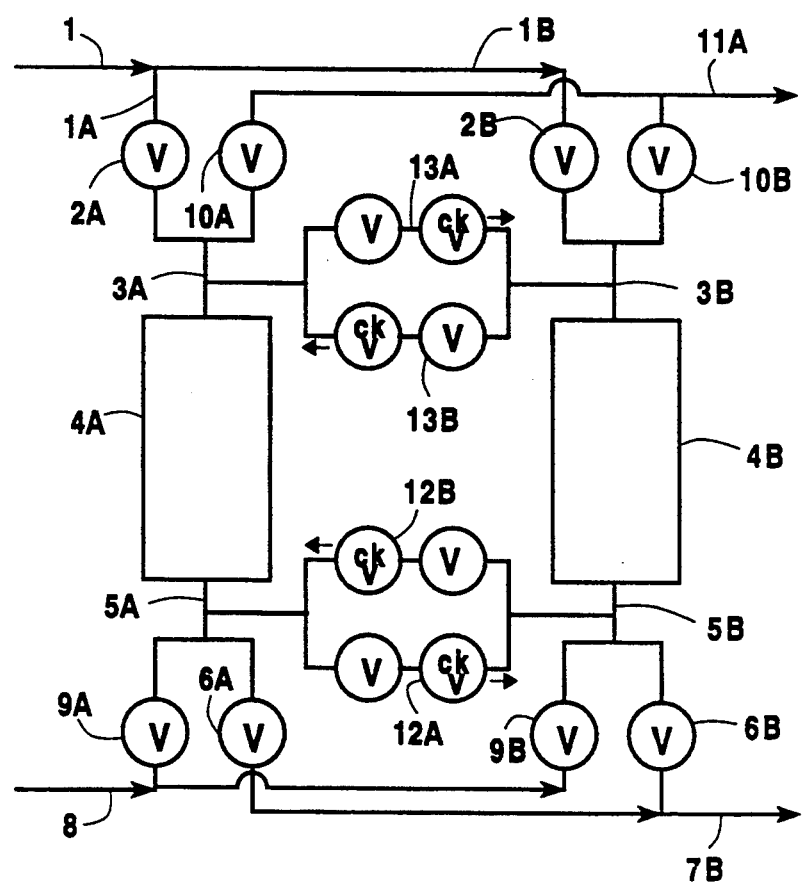
FIG. 2 is a schematic flow diagram of a two bed embodiment of the claimed process for the concentration of Li+ ions from dilute solutions thereof.

It is important to understand that the two part Charge and Regeneration steps essentially relate to any initial removal or flushing of the liquid solution contained in the bid, e.g. Bed A of FIG. 1 and the beds of the other figures, followed by ion exchange on the resin or zeolite itself. For that second step or phase, there is a mass transfer zone, and the cutoff of the process step depends on the extent to which the mass transfer zone exits the bed. Generally, it is preferred to maintain the mass transfer zone within the resin or zeolite bed, but, dependent on the economic value of the lithium in any particular application vis-a-vis the ion exchange system, it can be acceptable to allow some exit of the mass transfer zone from the bed during either the Charge or the Regeneration steps.

In an illustrative example of the invention in a single bed embodiment thereof, a one square meter cross section cylindrical column, one meter long, was packed with fine particles of the sodium form of a strong cation exchange resin. A volumetric external void fraction of 0.4 pertained, with an internal void fraction of 0.37. The exchange resin separation factor for Na+/Li+ was 1.6, which is typical for commercially available ion-exchange resins. The feed solution was 0.17M in Li+ and 0.006M in Na+, with a feed flow rate of 0.542 l/s. The purge or regenerating solution was 2.21M in Na+ and 0.006M in Li+, with a flow rate of 0.108 l/s.

Using this embodiment, the Li+ and Na+ loadings at various positions on the bed and the total ion storage were studied. The loading is the storage of ions as counter-ions on the ion exchange resin. Since the number of such sites is fixed, each site is occupied by either a Na− or Li− ion. The storage includes the ions in the aqueous solution and depends on the ionic concentrations in the solution. In such analysis, it was determined that, at the end of the Charge step, the loading "ion exchange front" is very diffuse because the resin-ion selectivity favors sodium over lithium. Nevertheless, the bed is approximately half loaded with lithium at this point, and this loading accounts for almost all of the total lithium storage.

At the start of the Regeneration step with concentrated Na+Cl− solution, a concentration wave is established at the bottom of the bed, and the total storage is increased in this region. As the wave passes upward through the bed, Na+ ions displace the Li+ ions loaded on the resin forcing the Li+ ions into solution. At a later time when the concentration wave has nearly passed out of the top of the bed, the Li+ stored in solution has increased further, while the lithium loading on the bed particles has decreased. As the regeneration continues, the bed becomes nearly completely loaded with Na+ ions.

In further studies, effluent stream concentrations were determined for the illustrative embodiment. A concentrated Na+ solution emerges at the beginning of the Charge step. This could be discharged as waste, but it is preferable to store this solution for later use in regeneration, or to send it to another bed that is starting the regeneration step. The total ionic strength of the effluent then drops to the level of that of the feed stream, but it is nearly all Na+Cl−, with the concentration of Li+ remaining very low. The concentration of Li+ increases near the end of the Charge step as the diffuse ion-exchange wave approaches the end of the bed. The step is terminated when the concentration of Li+ becomes so high that it represents an overall economic loss.

The effluent at the top of the bed is a dilute solution of Li+, similar in composition to the feed, at the start of the Regeneration step. This effluent could be included with the recovery product, but is preferable to store this solution for later use as part of the feed, or to send it to another bed that is at the beginning of the Charge step. As the concentration wave emerges, the concentration of Li+ increases to a peak value that is about 10 times the concentration of the feed stream. The Na+ concentration remains modest until the lithium reaches its maximum concentration. Thereafter, the Na+ concentration increases, and the Li+ concentration decreases. The step is terminated when the Li+ concentration becomes too low. The cycle is then repeated.

Figure 3:
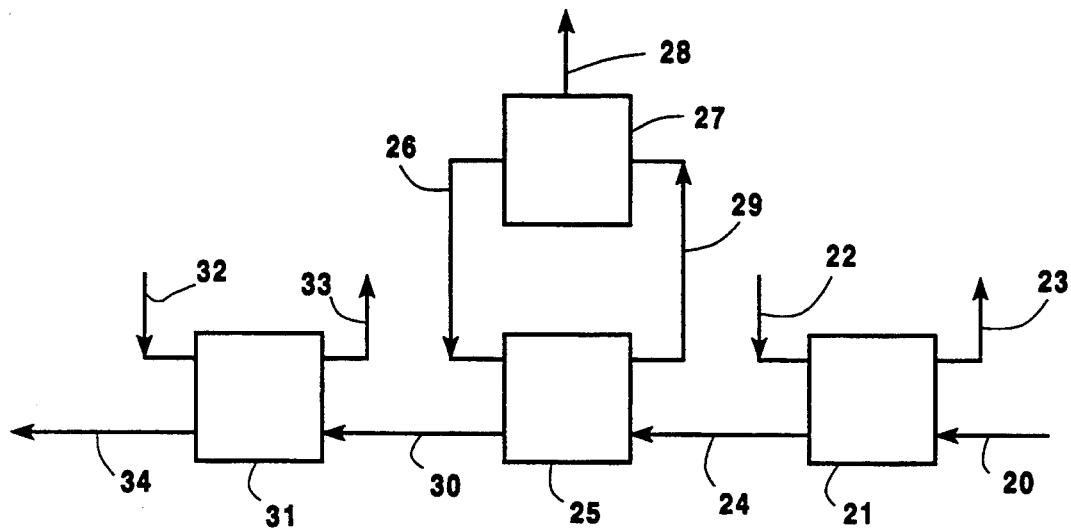
FIG. 3 is a schematic flow diagram of an embodiment of an overall process for the primary recovery of lithium in accordance with the practice of the invention.

The overall Li exchange process with primary lithium recovery is illustrated by the process flow diagram of FIG. 3 of the drawing. A zeolite material to be exchanged, such as a Na/KX molecular sieve zeolite, is passed in line 20 to ion exchange bed 21, wherein it is exchanged with a Na solution that passes to said bed through line 22, and is discharged therefrom through line 23. The resulting NaX zeolite is passed in line 24 to ion exchange bed 25, wherein it is contacted with a concentrated Li solution passed thereto in line 26 from primary lithium recovery unit 27 from which precipitated Na salts are removed through line 28. The exchanged lithium solution removed from ion exchanged bed 25 is passed in line 29 to said primary lithium recovery unit 27, wherein, by evaporative concentration and fractional crystallization, most of the NaCl is removed by precipitation. The remaining concentrated LiCl solution is recycled in said line 26 to ion exchange unit 25.

The concentrated LiX solution obtained in said ion exchange unit 25 is passed in line 30 to wash unit 31 wherein it is washed with a suitable wash liquor, such as water, that is passed to wash unit 31 through line 32, and which is discharged therefrom through line 33. The lithium exchanged product is recovered from wash unit 31 through line 34.

Figure 4:
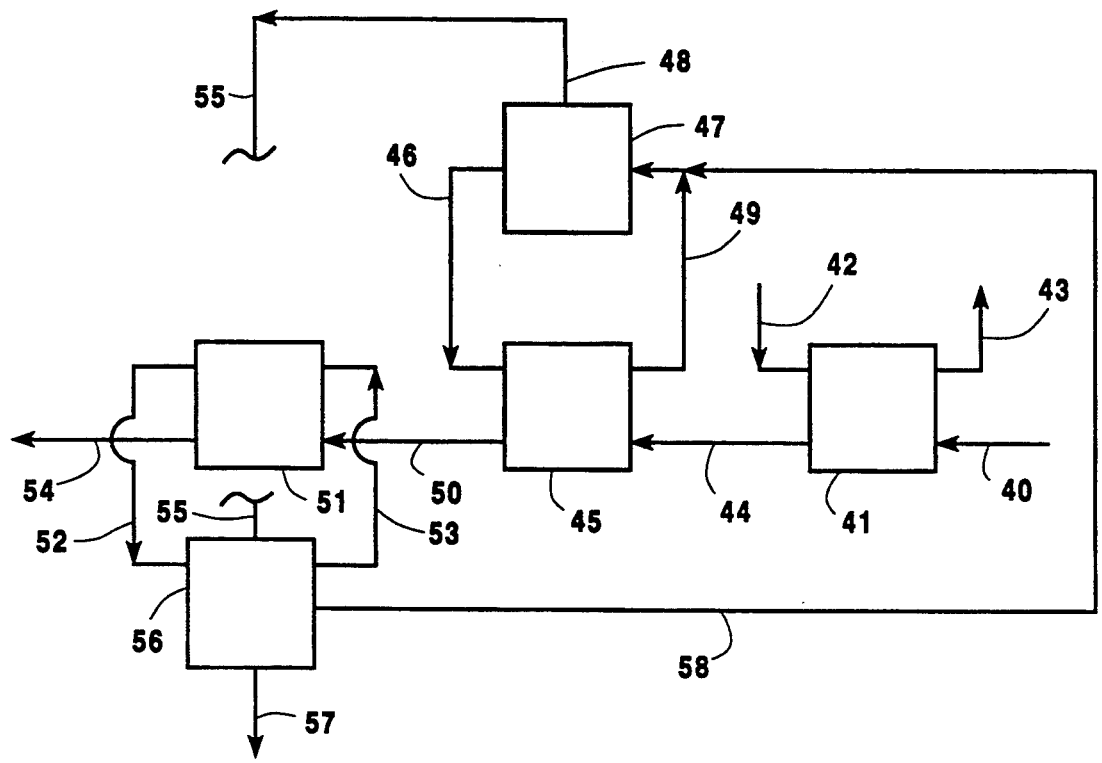
FIG. 4 is a schematic flow diagram of an embodiment of an overall process for the primary and secondary recovery of lithium in accordance with the practice of the invention.

FIG. 4 illustrates the overall process of the invention with primary and secondary lithium recovery. In this embodiment, a Na/K zeolite to be exchanged is passed in line 40 to ion-exchange bed 41, wherein it is contacted with a Na solution passed to said bed through line 42 and removed therefrom through line 43. The resulting Na X zeolite is passed in line 44 to ion exchange bed 45, wherein it is contacted with a concentrated solution passed thereto in line 46 from primary lithium recovery unit 47 from which precipitated Na salts are removed through line 48. The exchanged lithium solution from bed 45 is passed in line 49 to said primary lithium recovery unit 47, wherein by evaporative concentration and fractional crystallization, most of the NaCl is removed by precipitation. The remaining concentrated LiCl solution is recycled in said line 46 to ion exchange unit 45.

The lithium exchanged product obtained in said ion exchange unit 45 is passed in line 50 to wash unit wherein it is washed with a wash liquor that is passed to wash unit 51 through line 52 and is removed therefrom through line 53. The lithium exchanged product is recovered from wash unit 51 through line 54.

The precipitated Na salts, which contain residual lithium, removed from primary lithium recovery unit 47 through line 48 are conveniently passed through line 55 to secondary lithium recovery unit 56, along with spent wash liquor in line 53. In said secondary lithium recovery unit 56, the (1) Charge and (2) Regeneration steps are carried out in a one or multiple bed system as described above. Waste residue is removed from said unit 56 through line 57. The concentrated lithium solution obtained in said secondary lithium recovery unit 56 from the dilute lithium solution sources passed thereto is recycled in line 58 to primary lithium recovery unit 47. Alternatively, depending on the concentration of the solution in said lien 58, it may be passed directly to ion exchange unit 45, together with the concentrated lithium solution passing from primary lithium recovery unit 47 in line 46.

It will be understood that various changes and modifications can be made in the details of the invention without departing from the scope of the invention as set forth in the appended claims. Thus, the invention pertains not only to LiX, but to mixed cation materials, containing lithium and calcium, barium, cobalt, copper, potassium, strontium, chromium, iron, magnesium, manganese, nickel, zinc, and mixtures thereof. The convenient starting material, NaX, typically has a $SiO_2/Al_2O_3$ ratio of less than 3.0, more typically from about 2.0 to about 2.5, although other such NaX material can also be employed. In the preparation of LiX adsorbent for use in PSA air and other gas separation operations, it is generally desirable to employ lithium exchange levels above about 85%, typically above 88% and, preferably for many applications, 95% or above. For mixed cation applications, e.g. LiCaX, the lithium level will typically be from about 50 to about 90%, preferably from about 70% to about 85%.

The preparation of the various zeolite X materials for use in the practice of the invention, e.g. NaX having a $SiO_2/Al_2O_3$ ratio of about 2 or about 2.5 or other such material is well known and is not a part of the subject invention, which is directed to the increased recovery of lithium otherwise lost in the lithium exchange process. It will also be understood that the lithium exchange procedure itself does not form an essential part of the invention. The Chao patent, U.S. Pat. No. 4,859,217, discloses particular techniques for the synthesis of zeolite X starting material, and particular procedures that can be used to achieve the desired lithium exchanged material. Those skilled in the art will also appreciate that the lithium recovery process of the invention can also be applied to advantage with respect to lithium exchange processes pertaining to zeolite A or zeolite Y materials as well as the more commonly employed zeolite X material.

It has been indicated above that the Li+ recovery of the invention is carried out in one or more columns or beds packed with zeolite or with a strong acid cation exchange resins. Typical zeolites suitable for this purpose include the well known, commercially available zeolite materials, such as 13X, 5X and 4A zeolites, although any other adsorbent material capable of capturing and concentrating valuable ions, such as lithium ions, from a dilute solution thereof can also be employed. Strong acid cation exchange resins that can also function in the manner include, but are not limited to, polysulfonated resins, such as DOWEX TM 50 of the Dow Chemical Company.

In the description above, it is noted that, in Charge step (1), the Li+ concentration eventually rises in the discharge, with the step being terminated when the concentration becomes too high. The discharge concentration is generally a function of the value of the lithium and the cost of the exchange resin or zeolite. However, the typical concentration can be between 2% to 50%, more preferably 2% to 20% lithium cations in the solution. Typically, the waste stream would contain on the order of 20% of the total lithium present in the feed stream. Likewise, it was noted above that, early in the Regeneration step (2), a dilute Li+ solution emerges through line 3, valve 10 and line 11. When the concentration wave reaches the end of the bed, the concentration of Li+ rises appreciably, and the effluent from line 11 is the recovery product. This concentrated solution will have a lithium concentration of from about 50% to about 90%. Although the lithium concentration at which the concentrated solution is returned to the primary zeolite ion-exchange plant is dependent on various factors pertaining to any given application, the concentrated solution will generally be returned to the primary zeolite ion-exchange plant when the lithium concentration is above about 90%, preferably at least 99%, with the concentrated solution being generally passed to the recrystallization plant when the lithium content is less than this amount.

Figure 5:
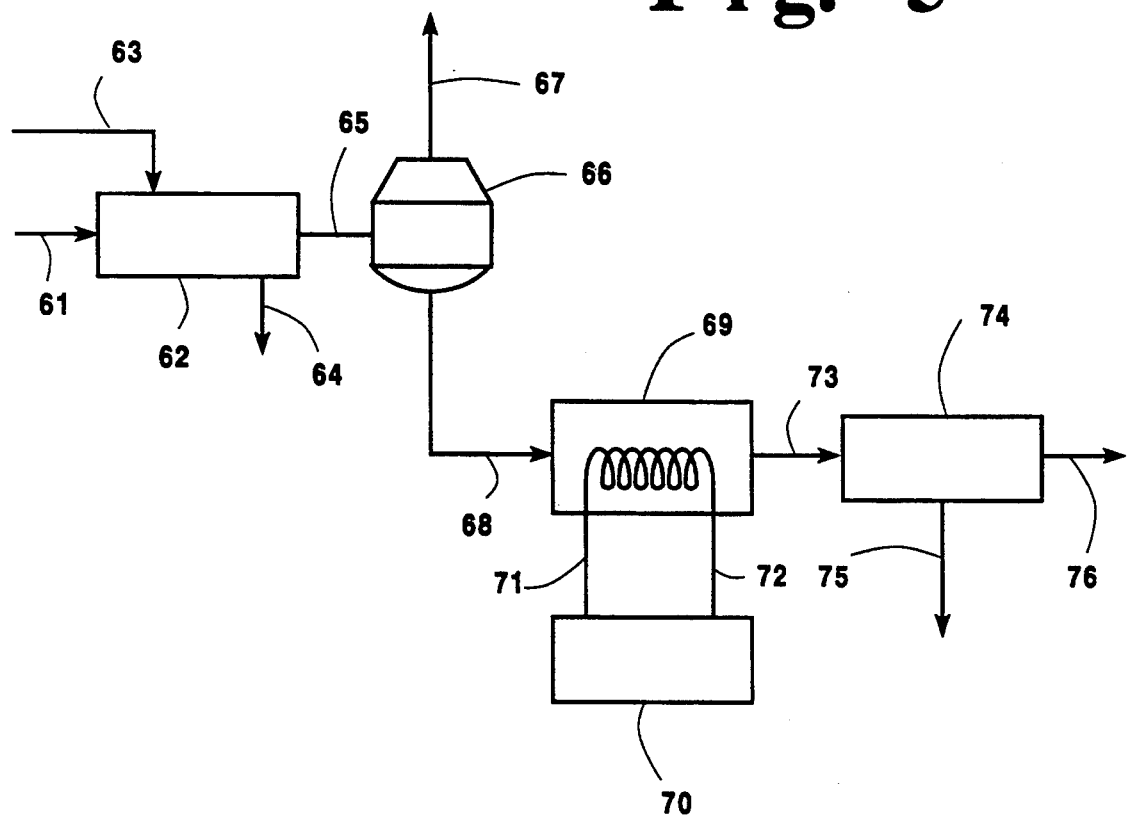
FIG. 5 is a schematic flow diagram of an embodiment of process for the primary recovery of lithium.

The evaporative concentration and fractional crystallization process referred to above is employed to remove, by precipitation, most of the NaCl from the spent ion-exchange system, leaving a concentrated Li+Cl− solution that can be reused in the ion-exchange process. Thus, the bulk of the lithium is retained in the overall ion-exchange system. Such evaporative concentration and fractional crystallization process and system is illustrated in FIG. 5 of the drawings. As shown therein, a dilute lithium chloride solution is passed in line 61 to heat exchanger 62 (i.e. line 49 in FIG. 4), where it is heated to approximately 300° F. by conducting steam (that enters heat exchanger 62 through line 63 and leaves said heat exchanger 62 through line 64. The heated solution is passed in line 65 to separator 66, from which water vapor is removed through line 67 so as to concentrate the solution. From said separation 66, the concentrated solution is passed in line 68 to cooling and precipitation unit 69, where it is cooled, typically to approximately 40° F. At this temperature, the NaCl impurity crystallizes from solution. Sufficient residence time is provided for the solution in said cooling and precipitation unit 69 to enable the impurity crystals to grow in size so that they can be easily separated from solution. Refrigeration to cooling and precipitation unit 69 is supplied by a properly sized refrigeration unit 70. Coolant from said refrigeration unit 70 enters cooling and refrigeration unit 69 through line 71 and returns to said refrigeration unit 69 through line 72. The cooled, impurity laden solution is passed from cooling and refrigeration unit 69 through line 73 to impurity separation unit 74, where the impurity crystals are separated and removed through line 75. The purified concentrated solution is then returned to the ion exchange unit through line 76, i.e. line 46 of FIG. 4.

The invention provides a significant advance in PSA processing for air separation and other commercially significant gas separation operations. The ability to use advanced lithium exchanged adsorbents for such PSA operations appreciably advances the overall efficiency thereof in satisfying the ever-increasing demands for the convenient PSA approach for the production of high purity oxygen and other industrial gases. The invention reduces the costs associated with the production of such advanced, lithium exchanged adsorbents by the secondary recovery of lithium from zeolite wash liquor and precipitate salts, in addition to the desired recovery of lithium from spent ion-exchange solution.

I claim:

1. A process for the capture and concentration of $L+$ ions from dilute solutions thereof in an ion-exchange system containing one or more beds of ion-exchange material capable of ion exchange between $Li+$ ions and $Na+$ ions, each bed undergoing a cyclic charge-regeneration cycle comprising:

(a) passing a dilute $Li+$ solution to a first end of said bed loaded [largely]with $Na+$ ions in equilibrium with a concentrated solution of $Na+Cl-$, said $Li+$ displacing some of the $Na+$ ions so that:
 (1) a concentrated $Na+$ rich solution is initially discharged from a second end of said bed; and
 (2) a dilute $Na+$ solution is thereafter discharged from the second end of the bed as process waste, the passing of a dilute $Li+$ solution to the first end of the bed being terminated upon increase in the $Li+$ concentration in the solution discharged from the bed;
(b) passing a concentrated solution of $Na+Cl-$ to the second end of the bed, said $Na+$ displacing some of the Li ions so that:
 (1) a dilute $Li+$ solution is initially discharged from the first end of said bed; and
 (2) a $Li+$ solution of increased concentration is thereafter discharged from the first end of said bed, the thus-concentrated lithium solution comprising the lithium recovery product, whereby lithium present in a dilute solution is effectively captured and concentrated.

2. The process of claim 1 in which the ion-exchange system contains one bed of ion-exchange material.

3. The process of claim 2 in which the dilute $Li+$ solution discharged in step (b) (1) and the concentrated $Na+$ rich solution discharged in step (a) (1) are passed to storage.

4. The process of claim 2 in which the dilute $Li+$ solution discharged in step (b) (1) is recovered as lithium recovery product.

5. The process of claim 2 in which the concentrated $Na+$ rich solution discharged in step (1)(1) is discharged to waste with the waste stream of step (1)(2).

6. The process of claim 1 in which the ion-exchange system contains two beds of ion-exchange material.

7. The process of claim 6 in which (1) the concentrated $Na+$ rich solution discharged from the second end of the first bed in step (a) (1) is recycled to the second end of the second bed in the system, and (2) the dilute $Li+$ solution initially discharged from the first end of the first bed in step (b) (1) is recycled to the first end of the second bed.

8. The process of claim 1 in which the concentrated lithium solution comprising lithium recovery product is passed to a lithium exchange unit.

9. The process of claim 8 in which the concentrated lithium solution comprising lithium recovery product is passed to an evaporative concentration and fractional crystallization unit prior to passage to the lithium exchange unit.

* * * * *